Dec. 13, 1960  S. KUBA ET AL  2,963,922
SINGLE DRIVE FOR MULTIPLE UNITS
Filed July 3, 1958  6 Sheets-Sheet 1

INVENTORS
S. KUBA
R. C. SHAFER
By W. R. Johnson
ATTORNEY

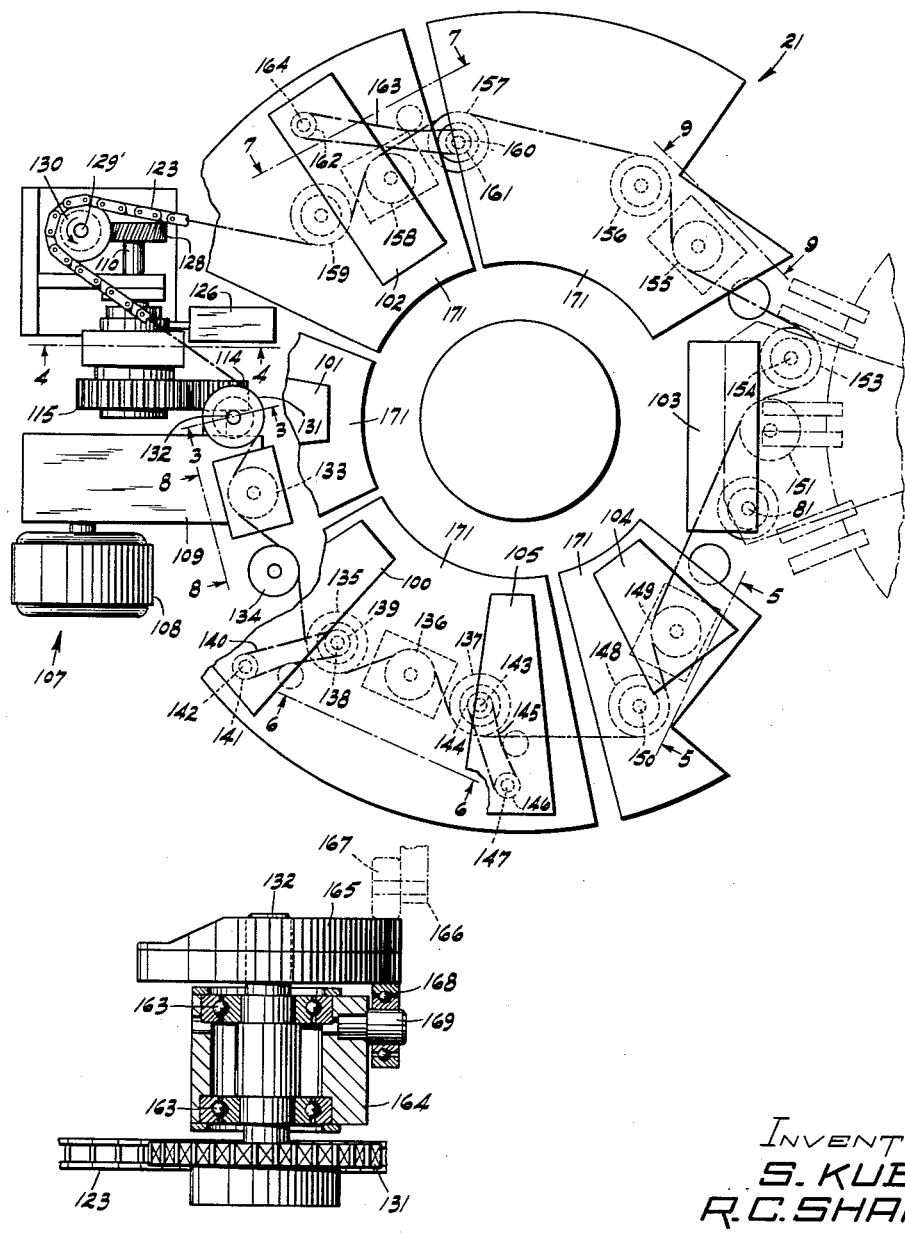

Dec. 13, 1960 S. KUBA ET AL 2,963,922
SINGLE DRIVE FOR MULTIPLE UNITS
Filed July 3, 1958 6 Sheets-Sheet 4
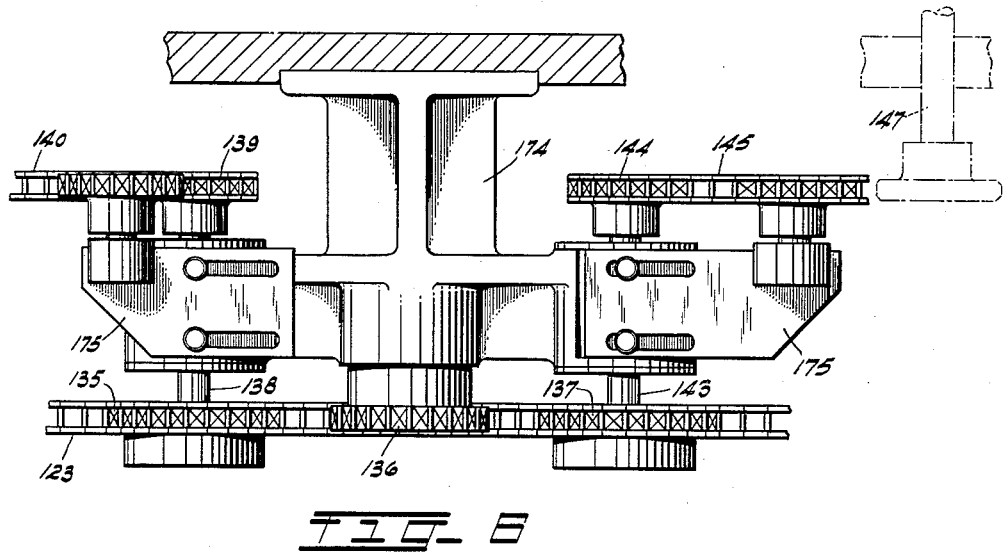
_Fig. 6_
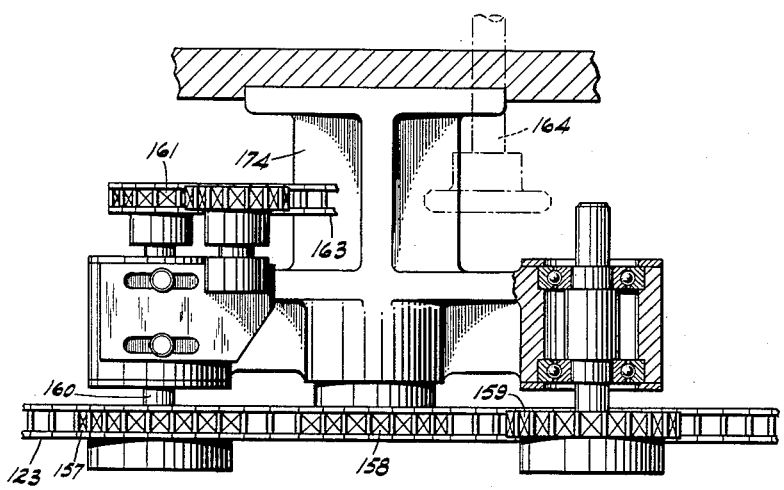
_Fig. 7_
INVENTORS
S. KUBA
R. C. SHAFER
By W. T. Johnson
ATTORNEY

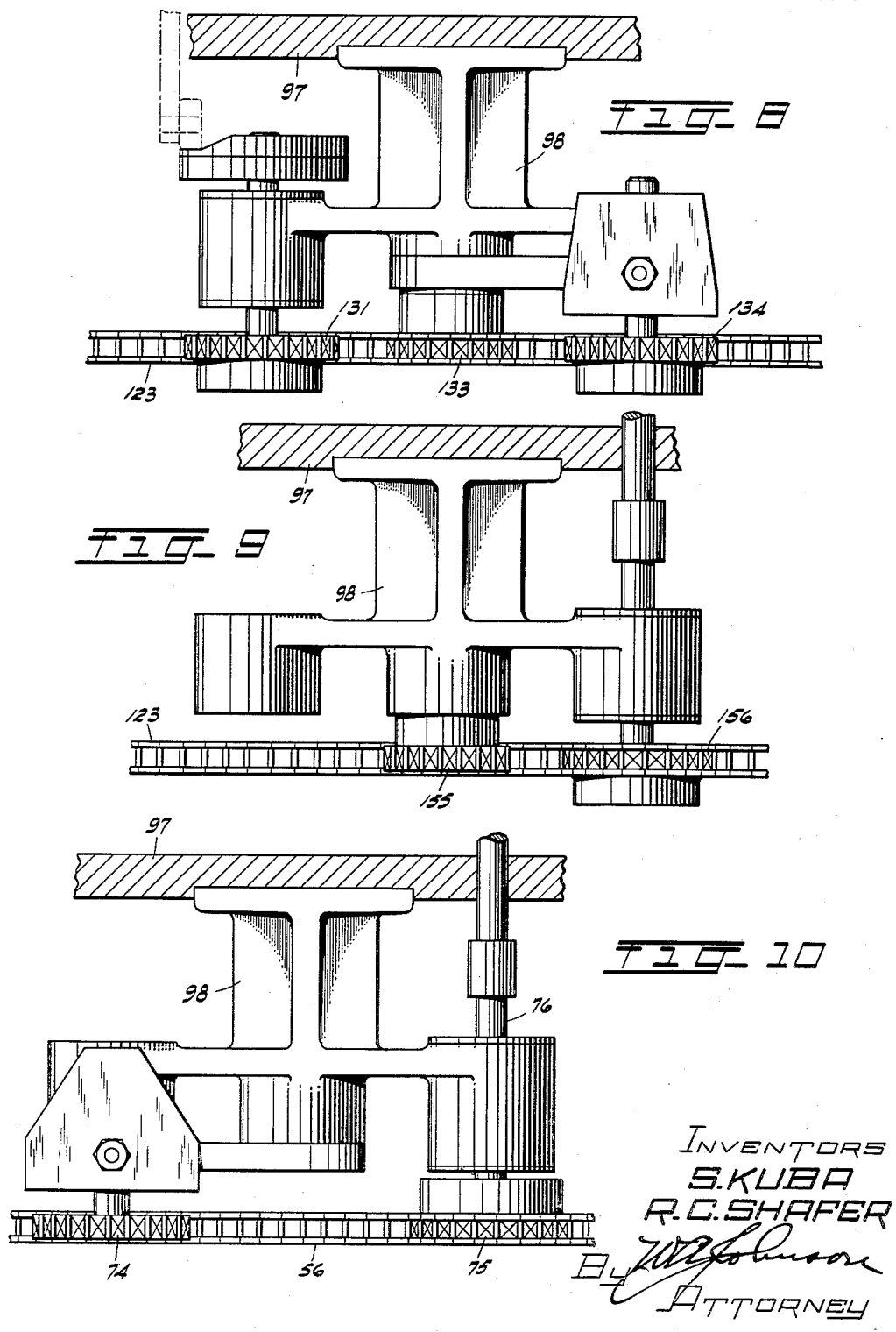

Dec. 13, 1960  S. KUBA ET AL  2,963,922
SINGLE DRIVE FOR MULTIPLE UNITS
Filed July 3, 1958  6 Sheets-Sheet 6

INVENTORS
S. KUBA
R.C. SHAFER
By W.A. Johnson
ATTORNEY

United States Patent Office 2,963,922
Patented Dec. 13, 1960

2,963,922

SINGLE DRIVE FOR MULTIPLE UNITS

Samuel Kuba, Allentown, and Richard C. Shafer, Emmaus, Pa., assignors to Western Electric Company, Incorporated, New York, N.Y., a corporation of New York Filed July 3, 1958, Ser. No. 746,426

3 Claims. (Cl. 74—722)

This invention relates to processing machines particularly driving means for the processing units thereof.

In certain types of processing machines, holders for the parts being processed are moved intermittently between intervals of rest to advance the parts to successive processing units which must be operated during the rest intervals. In certain instances, for example, as shown in the co-pending application of R. C. Shafer Serial No. 745,388 filed June 30, 1958, processing machines, of the turret type are mounted adjacent each other and adapted, through the operation of their processing units, to feed parts to the holders of each turret, to form sub-assemblies of the articles while in the various processing stations and finally to assemble the sub-assemblies into completed articles near the junctures of the machines. It is important that the driving means for the processing units complete their operating cycles during the intervals of rest of the turrets and it is further important that the drives for the machines be synchronized to assure accurate joining of the sub-assemblies to form the articles thereof.

The object of the present invention is a drive for a processing machine including a plurality of processing units, the driving means being operable efficiently to drive the units simultaneously.

In accordance with the object, the invention is employed in combination with a plurality of processing units drivable through predetermined cycles, the invention comprising power means, with a single endless member connecting the power means to all of the units to cause driving of the units simultaneously.

More specifically, the invention is in combination with processing machines of the turret type, each machine having holders, for parts of sub-assemblies, movable intermittently between intervals of rest where the holders will be located at processing stations near processing units. The processing units are adapted to be operated through complete cycles during intervals of rest of the machines and the driving means of the present invention includes individual shafts for the processing units, all of the shafts in each machine being driven by an endless member connected to the output of a power means therefor. Furthermore, an intermediate member or element is driven by each endless member to synchronize the movements of the endless members of each machine.

Other objects and advantages will be apparent from the following detailed description, when considered in conjunction with the accompanying drawings wherein:

Fig. 2 is a top plan view of another processing machine embodying the invention, portions thereof being broken away;

Fig. 3 is an enlarged vertical sectional view taken along the line 3—3 of Fig. 2;

Fig. 6 is an enlarged vertical sectional view taken along the line 6—6 of Fig. 2;

Fig. 7 is an enlarged vertical sectional view taken along the line 7—7 of Fig. 2;

Fig. 8 is an enlarged sectional view taken along the line 8—8 of Fig. 2;

Fig. 9 is an enlarged vertical sectional view taken along the line 9—9 of Fig. 2;

Fig. 10 is an enlarged vertical sectional view taken along the line 10—10 of Fig. 1;

Figure 1:
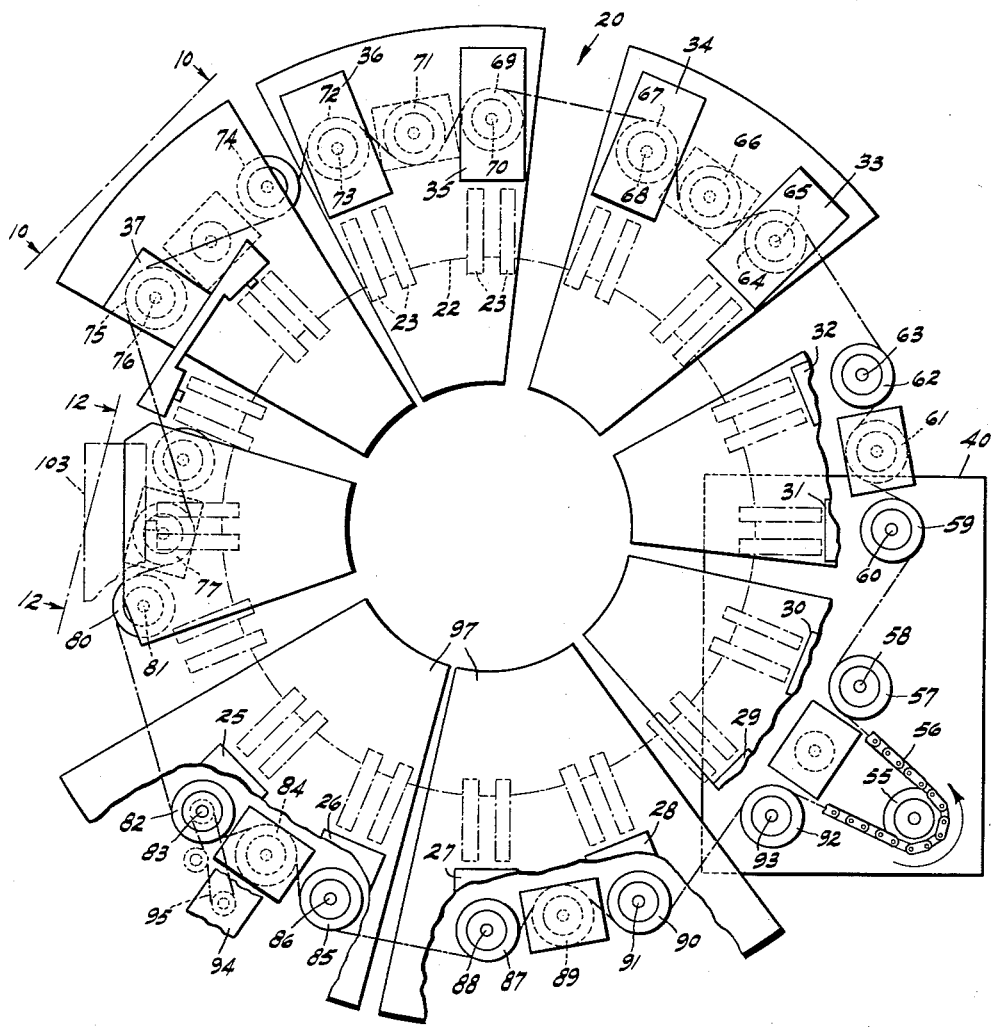
Fig. 1 is a top plan view of one processing machine embodying the invention.

The present invention is embodied in machines 20 and 21 shown in Figs. 1 and 2 respectively, and joined together as illustrated in Fig. 2. These machines are of the turret type wherein holders for parts which are to form sub-assemblies of articles which are to be joined at the junctures of the machines to complete the articles and are moved intermittently between like intervals of rest to present the holders to processing units. Concentrating first on the machine shown in Fig. 1, the turret 22 therefor is provided with pairs of holders 23 positioned radially about the turret to receive parts which are to be processed or formed into a sub-assembly. The processing units in the machine 20, moving counter-clockwise about the turret 22, include a unit 25 to feed a metallic ribbon to the holders 23 at the loading station. A processing unit 26 deposits drops of solder at spaced portions of the ribbon while the processing unit 27 punches out a central portion of the ribbon between the solder deposits and a processing unit 28 bends the inner ends of the ribbon portions downwardly to produce vertical extending parallel portions. A processing unit 29, in the present instance, applies a coating of flux to both solder deposits on the bent portions of the ribbon and processing unit 30 feeds and mounts a transistor bar to the bent portions of the ribbon. Processing units 31 and 32 are moved adjacent to and are actuated to direct sprays of water or other cleaning liquid onto the bar. Units 33 and 34 at their respective stations perform etching operations on the bar. Units 35 and 36 are operated similar to units 31 and 32 to rinse the bar at each station to wash the etching solution therefrom. A unit 37 is operated to move air nozzles closely adjacent the bar at the respective stations to dry the bar and the adjacent areas of the ribbon portions.

Figure 11:
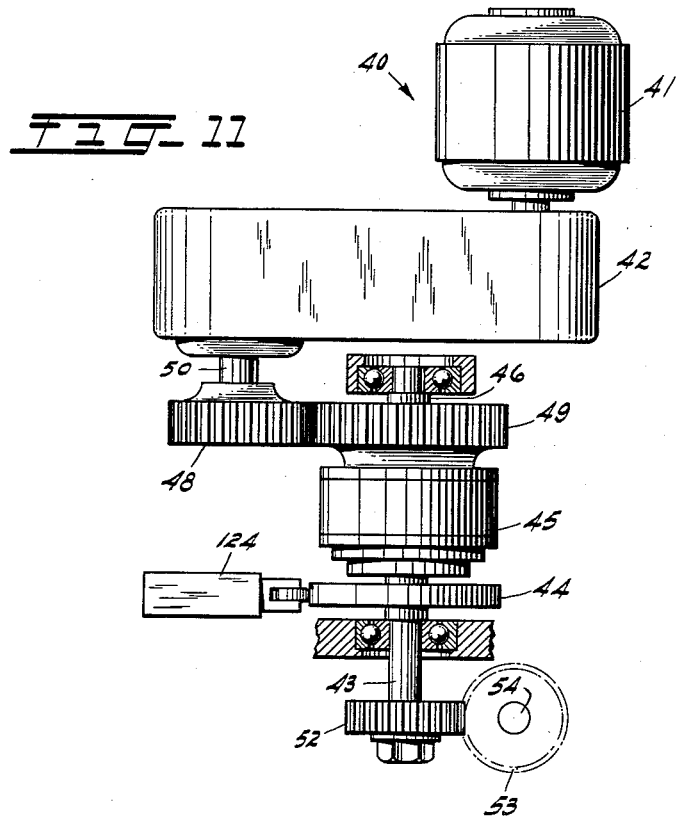
Fig. 11 is an enlarged vertical sectional view of the driving means for the machine shown in Fig. 1.

The various units 25 to 37 inclusive are driven through single cycles to perform their various functions during predetermined intervals of time as a result of a single drive 40 represented by a box-like structure in Fig. 1 is shown more in detail in Fig. 11. This drive includes a motor 41 which is energized continuously to drive a gear reduction unit 42 to eventually drive an output shaft 43. Interposed between the output shaft 43 and the unit 42 are aligning elements 44, mounted directly on the shaft 43, a one-revolution clutch 45 for connecting the shaft 43 and a shaft 46, and timing gears 48 and 49, the gear 48 being mounted on a shaft 50 on the unit 42 and the gear 49 being mounted on the shaft 46. A gear 52 is mounted on the output shaft 43 and engages a gear 53 mounted on a shaft 54. The shaft 54 has a sprocket 55 mounted on the upper end thereof to engage and drive an endless member 56 which in the present instance is a chain.

Figure 12:
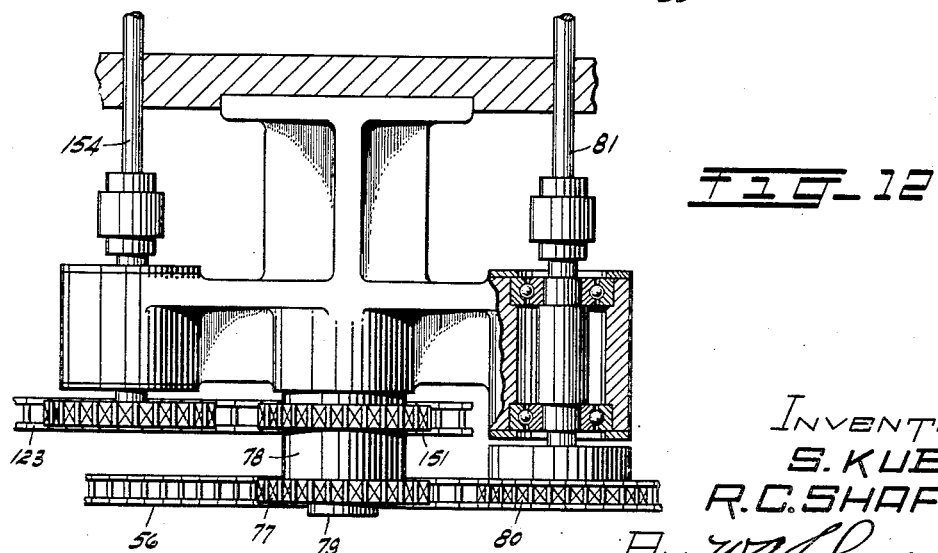
Fig. 12 is an enlarged vertical sectional view taken along the line 12—12 of Fig. 1.

In following the endless member or chain 56 from the sprocket 55 in its direction of travel it will be found that it drives a sprocket 57 of a drive shaft 58 for unit 30, and a sprocket 59 of a drive shaft 60 for unit 31. At this point, the member 56 engages an idler sprocket 61 then the sprocket 62 of a drive shaft 63 for unit 32, a sprocket 64 of a drive shaft 65 for unit 33, an idler sprocket 66, a sprocket 67 of a drive shaft 68 for unit 34, a sprocket 69 of a drive shaft 70 for unit 35, an idler sprocket 71, a sprocket 72 of a drive shaft 73 for unit 36, a sprocket 74 and sprocket 75 of a drive shaft 76 for unit 37. After leaving sprocket 75 the endless member 56 engages a bottom sprocket 77, Fig. 12, of a double sprocket element 78 which is free to rotate on a spindle 79. This double sprocket element 78 is a synchronizing element operatively connecting the endless member 56 of the machine 20 and an endless member of the machine 21. Continuing from sprocket 77, the endless member 56 engages sprocket 80 of drive shaft 81, sprocket 82 of drive shaft 83 for unit 25, idler sprocket 84, sprocket 85 of drive shaft 86 for unit 26, sprocket 87 of drive shaft 88 for unit 27, idler sprocket 89, sprocket 90 of drive shaft 91 for unit 28, sprocket 92 of drive shaft 93 for unit 29 and back to sprocket 55. In one instance an additional unit 94 is driven by a sprocket and chain drive 95 from shaft 83.

The processing units 25 to 37 inclusive and 94 are mounted upon stationary supports 97 positioned beneath and extending beyond the turret 22. Suitable bearing brackets 98 are fixed to the undersurfaces of the supports 97 and are adapted to rotatably support the shafts for each group of sprockets. In some instances the shafts for the processing units extend vertically through the supports 97 and are operatively connected to their respective units to drive them during the intermittent motions of the endless member 56 controlled by the one revolution clutch 45 of the power means 40 to move the processing units through their complete operating cycles. In other instances, cams are mounted on the shafts to bring about suitable rocking actions needed at certain of the stations such as the rinsing units 31 and 32, the etching units 33 and 34, the rinsing units 35 and 36 and the drying unit 37.

The machine 21 is also of the turret type having chuck-like holders, not shown, but illustrated in the aforementioned co-pending application to receive parts for another sub-assembly of the articles to be formed by the two machines and to present them successively to the processing units at the various stations. First there is a loading unit 100 where head-like portions or parts having two main leads and a base lead are mounted in the successive chucks as they reach the loading station. A unit 101 operates to trim the leads to predetermined lengths, a processing unit 102 mounts a metal ribbon on the base lead and forms it to a predetermined shape. A unit 103 receives a driving force from the driving means of both machines to join the sub-assemblies of the machines 20 and 21 into an article. Processing unit 104 trims the ribbon portions of the sub-assemblies of machine 20 and unit 105 unloads the article from the machine 21.

The processing units 100 to 105 inclusive are driven by a single drive 107 which is identical to the drive 40 including a motor 108, which is continuously energized to drive a gear reduction unit 109 to drive an output shaft 110. Interposed between the output shaft 110 and the unit 109 is an element 111 to control the starting and stopping positions of the output shaft 110, a one revolution clutch 112 and timing gears 114 and 115. A portion of the mechanism is shown more in detail in Fig. 4 where the element 111 is provided with a V-shaped groove 117 to receive a roller 118 supported by a core 119 of a solenoid 120. A spring 121 normally urging the core outwardly with sufficient force to cause rocking of the shaft 110 through rocking of the element to center the roller 118 in the groove 117 to assure accurate starting and stopping positions of an endless member 123 which drives the shafts for the processing units. The element 44, Fig. 11 for the drive 40 of the machine 20 has a groove identical with the groove 117 and a solenoid 124 operable to accomplish the same purpose of controlling the starting and stopping positions of the output shaft 43 and also the endless member 56. The clutch 112 of the power means or drive 107 is disengaged at the end of each cycle by a latch 125 which is momentarily moved to free the clutch for engagement by energization of a solenoid 126. The solenoids 120 and 126 of the drive 107 (Fig. 4) and the similar solenoids for the drive 40 (Fig. 11) are in a single circuit or in circuits controlled by a single electrical timing unit (not shown) to cause all four solenoids to operate simultaneously. Their periods of energization are short, sufficient however to release each clutch 112 and 45 for operation and release each positioner from grooves in elements 111 and 44. Before the operating cycle is completed, the four solenoids are de-energized conditioning the latches, such as latch 125 to disengage the clutches. The latch 125 is in the form of a bar, square in cross-section and slidable in an aperture of a holder. The right end of the latch or bar 125 is connected by a screw or the like to the core of the solenoid. When the solenoid 126 is energized, its core is moved to the right to move the latch 125 against the force of the spring shown to free it from the clutch. A similar clutch is shown in a patent to E. C. Scott, 2,701,043. The same structure is provided but not shown for the clutch 45. The output shaft 110 has a gear 128 mounted thereon for interengaging a gear 129 of a shaft 129' which extends upwardly through bearings and has a sprocket 130 mounted on the upper end thereof. The sprocket 130 rotates counter-clockwise to drive the endless member 123 in the direction of the arrow, Fig. 2. In following the travel of the endless member 123 from the sprocket 130 it will drive a sprocket 131 and a drive shaft 132, for processing unit 101, and sprockets 133, 134, 135, 136 and 137. Sprocket 135 is mounted on a shaft 138 with a smaller sprocket 139 which is connected by a chain or endless member 140 to a sprocket 141 which is mounted upon a shaft 142 adapted to drive unit 100. Sprocket 137 is mounted on a shaft 143 with a smaller sprocket 144, the smaller sprocket being connected by an endless member or chain 145 to a sprocket 146, which is mounted on a shaft 147 to drive unit 105. When the endless member 123 leaves sprocket 137 it drives sprocket 148, and sprocket 149 of a shaft 150 for unit 104. After leaving sprocket 149, the endless member 123 drives a sprocket 151 of the synchronizing element 78, Fig. 12, which is also connected to the endless member 56 of the machine 20. After leaving the sprocket 151, the endless member 123 drives sprocket 153 of a shaft 154 which cooperates with shaft 81 to drive unit 103. After leaving sprocket 153, the endless member 123 drives sprockets 155, 156, 157, 158 and 159 before returning to sprocket 130. Sprocket 157 is mounted on shaft 160 with a smaller sprocket 161 which is operatively connected to a sprocket 162 by an endless member or chain 163. The sprocket 162 is mounted on a shaft 164 which drives unit 102.

Figure 4:
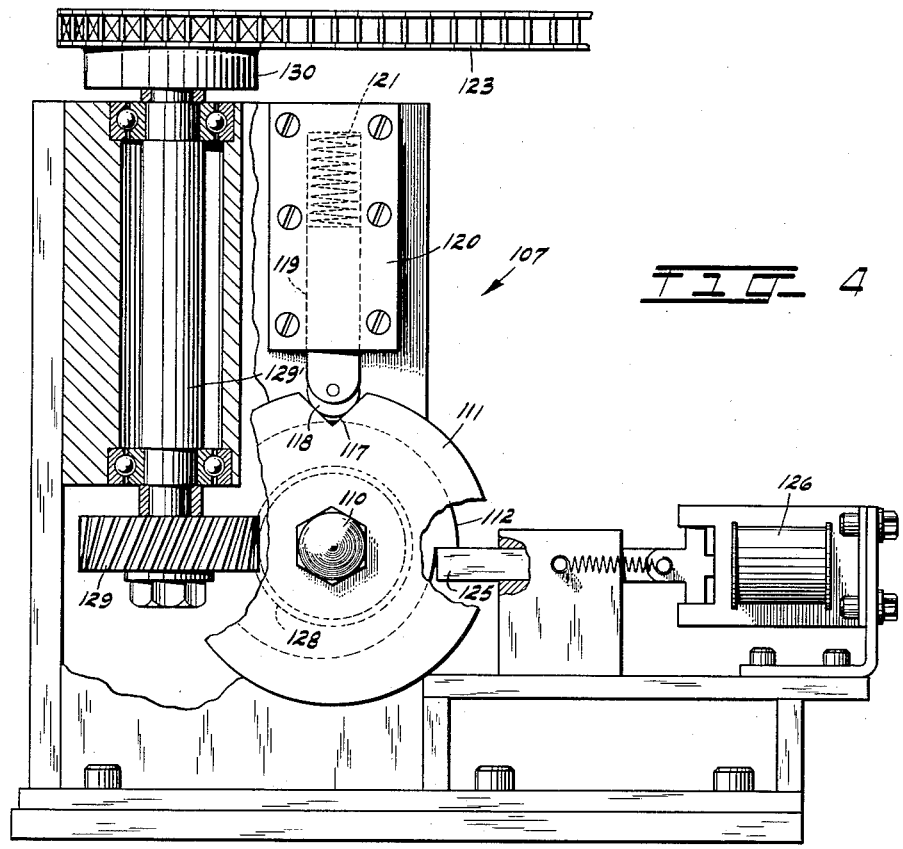
Fig. 4 is an enlarged vertical sectional view taken along the line 4—4 of Fig. 2.
Figure 5:
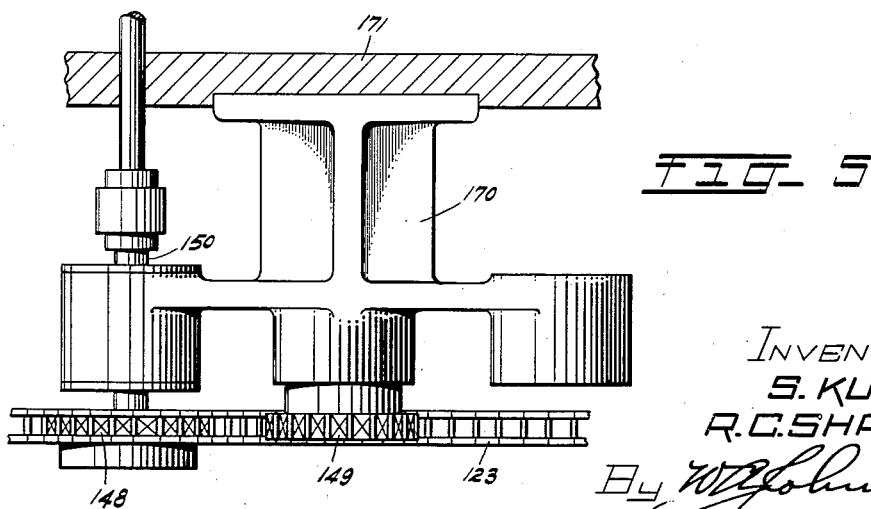
Fig. 5 is an enlarged vertical sectional view taken along the line 5—5 of Fig. 2.

Some of the structures surrounding a driving means of Fig. 2 are shown more in detail in Figs. 3 to 9 inclusive. In Fig. 3 the shaft 132 for sprocket 131 is journaled in bearings 163 of a bearing bracket 164 and has a cam 165 mounted on the upper end thereof. In this instance, the cam 165 is to operate a lever or reciprocable member 166 which carries a roller or cam follower 167 riding upon the upper face of the cam. A roller-like bearing 168 is mounted on a spindle 169 carried by the bracket 164 to support the weight or force applied to the cam by the cam follower 167. The structure of Fig. 4 was described previously. In Fig. 5, a bracket 170 is mounted on the undersurface of a support 171, which is one of a plurality of supports for the units, that are mounted on the top thereof, and the various driving means associated with the endless member 123, that are mounted beneath the various supports 171. Fig. 6 illustrates a bearing bracket 174 for the shafts 138 and 143 and adjustable brackets 175 for portions of the driving mechanisms for the shafts 142 and 146. Figs. 8, 9 and 10 disclose other arrangements for connecting the driving action of the endless member 123 to the different units. Although Figs. 1 and 2 show different machines 20 and 21 separately with their plurality of processing units driven by their drives 40 and 107, Fig. 2 does show the interconnection of the machines and Fig. 12 discloses the operative connection of the drive means 56 and 123 through the synchronizing element 78.

*Operation*

The functions of the various processing units are defined in the aforementioned co-pending application, it being important that these units operate within predetermined intervals of time which are included in the intervals of rest of the turret type portions of the machines 20 and 21. For this reason, the power units 40 and 107 whose motors are driven continuously have their clutches 45 and 111 free to engage at desired intervals of time or simultaneously. Their timing gears 48—49 and 114—115 control the speeds of their output shafts 43 and 110 to control the speed of the operating cycles of the processing units. Regardless of the perfection of the operating means, particularly when the driving force is transferred from a single drive through a single endless member to the various processing units in each machine, it is important that the individual endless members be held to perfection as far as their driving motions are concerned particularly the starting and stopping intervals through the adjusting feature of the element 111 and the roller 118. The structure of Fig. 4, is adapted to adjust the starting and stopping positions of the endless members to assure accurate timing of the cycles of the processing units of machines 20 and 21. When the completed sub-assemblies reach the joining station for completion by the processing unit 103, the actions of the endless members 56 and 123 are synchronized. This is brought about by the synchronizing element 78 whose sprocket portions 77 and 151 are connected directly to the endless members 56 and 123 to keep the motions of these members in step for joining of the sub-assemblies by the unit 103.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A drive mechanism for a plurality of parallel drive shafts disposed at stationary stations around an intermittently movable turret comprising means to rotatably support the drive shafts at their stations, a single continuously operable power means mounted at a fixed position and having an output shaft, an endless member extending around the turret, operatively connected to all the drive shafts and movable longitudinally a given distance intermittently to cause simultaneous predetermined revolving movements of the drive shafts, a drive element mounted on the output shaft and operatively connected to the endless member, a clutch interposed between the output shaft and the power means, and a clutch controlling unit operated after each intermittent movement of the turret to free the clutch to connect the output shaft to the power means and also operated to disconnect the output shaft from the power means at the completion of one cycle of the output shaft, an element mounted fixedly on the output shaft, and a positioning unit mounted at a fixed location adjacent thereto and operable for engagement with the element to locate the output shaft prior to each single cycle at a given starting position.

2. A drive mechanism according to claim 1 in which said positioning unit comprises an annular element having a V-groove in its periphery fixedly mounted on the output shaft with its axis coincident with the axis of the output shaft, a positioning roller positioned to ride on the periphery of the annular element and cooperating with the groove when disposed therein to locate the output shaft at starting and stopping positions thereof.

3. A drive mechanism according to claim 2 in which a solenoid is mounted adjacent to the roller and operatively connected thereon, and means operated upon stopping of the turret to energize the solenoid to move the roller free of the V-groove.

References Cited in the file of this patent

UNITED STATES PATENTS

| | | |
|---|---|---|
| 624,377 | Pugh | May 2, 1899 |
| 2,117,484 | Lewellen et al. | May 17, 1938 |
| 2,541,625 | Webster | Feb. 13, 1951 |
| 2,651,947 | Wilson | Sept. 15, 1953 |
| 2,772,579 | Jeffery | Dec. 4, 1956 |
| 2,837,935 | Deliso | June 10, 1958 |